United States Patent

Miya et al.

[11] Patent Number: 5,596,040
[45] Date of Patent: Jan. 21, 1997

[54] POLYPHENYLENE ETHER RESIN COMPOSITION CONTAINING MODIFIED AROMATIC HYDROCARBON-FORMALDEHYDE RESIN, RUBBER POLYMER AND POLYAMIDE RESIN

[75] Inventors: Shinya Miya, Kanagawa; Yuichi Kano, Osaka; Hisayuki Kuwahara; Takeshige Kasuya, both of Kanagawa; Yosio Fukaya, Chiba, all of Japan

[73] Assignee: Mitsubishi Gas Chemical Company, Inc., Tokyo, Japan

[21] Appl. No.: 539,103

[22] Filed: Oct. 4, 1995

Related U.S. Application Data

[63] Continuation of Ser. No. 194,221, Feb. 9, 1994, abandoned.

[30] Foreign Application Priority Data

Feb. 9, 1993 [JP] Japan .................................. 5-021333
Sep. 9, 1993 [JP] Japan .................................. 5-224591

[51] Int. Cl.⁶ .......................... C08L 51/04; C08L 71/12
[52] U.S. Cl. .................. 525/92 B; 525/66; 525/92 D; 525/92 K; 525/133; 525/397
[58] Field of Search ........................... 525/92 B, 92 D, 525/92 K, 397, 133, 66

[56] References Cited

U.S. PATENT DOCUMENTS

| | | | |
|---|---|---|---|
| 4,153,644 | 5/1979 | Sugio et al. | 525/92 |
| 4,970,272 | 11/1990 | Gallucci | 525/397 |
| 5,084,511 | 1/1992 | Abo et al. | 525/68 |
| 5,106,899 | 4/1992 | Maresca | 524/372 |
| 5,304,593 | 4/1994 | Nishio et al. | 524/451 |

FOREIGN PATENT DOCUMENTS

| | | |
|---|---|---|
| 0244090 | 4/1987 | European Pat. Off. |
| 0572676 | 8/1993 | European Pat. Off. |
| 2558290 | 8/1976 | Germany |

*Primary Examiner*—Ana Woodward
*Attorney, Agent, or Firm*—Sughrue, Mion, Zinn, Macpeak & Seas

[57] ABSTRACT

A thermoplastic resin composition comprising:

(a) about 20 to 80% by weight of polyphenylene ether resin comprising at least one structural unit in its backbone represented by the formula:

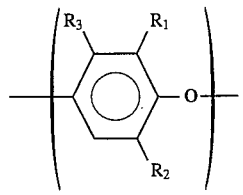

wherein (b) about 0.01 to 10% by weight of a modified aromatic hydrocarbon-formaldehyde resin produced by modifying an aromatic hydrocarbon-formaldehyde resin which is obtained by reacting alkyl benzene with formaldehyde, using a modifying agent reactive with its methylol group, methylene ether group, or acetal group;

(c) about 2 to 30% by weight of a rubber-like polymer; and (d) about 20 to 80% by weight of a polyamide resin; and a method for its preparation.

5 Claims, No Drawings

POLYPHENYLENE ETHER RESIN COMPOSITION CONTAINING MODIFIED AROMATIC HYDROCARBON-FORMALDEHYDE RESIN, RUBBER POLYMER AND POLYAMIDE RESIN

This is a Continuation of application Ser. No. 08/194,221, filed Feb. 9, 1994 now abandoned.

FIELD OF THE INVENTION

The present invention relates to a polyphenylene ether resin composition. In more detail, the present invention relates to a thermoplastic composition which is improved in molding processability, solvent-resistancy, oil-resistancy and impact-resistancy, which is characterized in that modified aromatic hydrocarbon-formaldehyde resin, rubber-like polymer and polyamide resin are formulated with a polyphenylene ether resin.

The polymer composition of the present invention can be utilized in a wide variety of fields, such as electronic and electric components, automotive components, mechanical components, architectural components, and household commodities.

BACKGROUND OF THE INVENTION

Polyphenylene ether resins are excellent in thermal properties, mechanical properties and electric properties, but are difficult to mold, because of their high melt processing temperature and small flowability. Further, polyphenylene ether polymers have excellent resistance to inorganic reagent, such as acid and alkali, however, polyphenylene ether resin is caused to melt or swell by organic solvents, such as acetone, toluene and halogen hydrocarbons, and, is poor in solvent-resistance and oil-resistance. Various approaches to overcoming these problems are proposed.

In Japanese Patent Publication No. Sho. 52-3826, for the purpose of improving molding properties, a resin composition comprising polyphenylene ether resin and aromatic hydrocarbon-formaldehyde resin or the modified resin is described.

In Japanese Patent Publication No. Sho. 52-3827, for the purpose of improving molding properties and impact resistance, a resin composition comprising polyphenylene ether resin and aromatic hydrocarbon-formaldehyde resin or the modified resin, and a rubber-like polymer is described.

However, in these compositions, solvent resistance, oil resistance and impact resistance are not sufficient.

In Japanese Patent Publication No. Sho. 60-11966, for the purpose of improving solvent-resistance, a method of adding a compound which has a specific structure, such as maleic anhydride, maleimide and fumaric acid, to a polyphenylene ether resin and polyamide resin as a compatibilizer and melt-mixing is described.

Further, in Japanese Patent Publication (Toku-Hyo-Sho) No. 61-502195, a method of adding citrate or malic acid to a polyphenylene ether resin and polyamide resin as a compatiblizer and melt-mixing is described.

However, a composition obtained from these methods is not sufficient in impact resistance, and further, a part of the compatiblizer which is added at the melt-mixing is volatilized, thereby not only decreasing the effect of the compatibilizer, but also polluting the working atmosphere due to the strong odor.

SUMMARY OF THE INVENTION

The inventors of the present invention have now discovered a thermoplastic composition which has excellent molding properties, solvent-resistance, oil-resistance and impact-resistance, without losing appearance of the molded article, mechanical properties physical properties and thermal resistance.

The inventors of the present invention have extensively studied in order to overcome the deficiencies of polyphenylene ether resin without losing the excellent properties which polyphenylene ether resin has, and have now found that these and other objects of the present invention can be achieved by a composition containing a modified aromatic hydrocarbon-formaldehyde resin, a rubber-like polymer, a polyamide resin and a polyphenylene ether resin.

That is, the present invention relates to a thermoplastic resin composition which comprises:

(a) about 20–80% by weight of polyphenylene ether resin comprising at least one structural unit in its backbone represented by the formula:

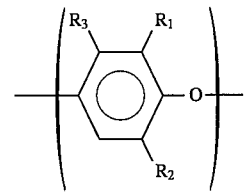

wherein $R_1$ is lower alkyl group having 1 to 3 carbon atoms; $R_2$ and $R_3$, which may be the same or different, are each hydrogen or a lower alkyl group having 1 to 3 carbon atoms;

(b) about 0.01 to 10% by weight of a modified aromatic hydrocarbon-formaldehyde resin;

(c) about 2 to 30% by weight of a rubber-like polymer; and (d) about 20 to 80% by weight of a polyamide resin.

DETAILED DESCRIPTION OF THE INVENTION

The present invention is now described in greater detail as follows. In the present invention, the polyphenylene ether resin (a) utilized in the present invention are, for example, poly(2,6-dimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, etc.

In the above, poly(2,6-dimethyl-1,4-phenylene) ether, copolymer of 2,6-dimethyl-1,4-phenol and 2,3,6-trimethyl-1,4-phenol, and their modified graft polymers with styrene or maleic anhydride are preferable.

The intrinsic viscosity of the polyphenylene ether resin is preferably within the range from 0.20 to 0.60 dl/g, when measured in chloroform at 25° C. When the intrinsic viscosity is higher than 0.60 dl/g, the melting viscosity of the composition becomes high, and bar flow value decreases, so that forming of thin-wall molded large material becomes difficult, and when the intrinsic viscosity is lower than 0.20 dl/g, a large decrease of mechanical strength occurs, reducing the practical value of the molded material.

In the present invention, the modified aromatic hydrocarbon-formaldehyde resin (b) utilized in the present invention is obtained by modifying an aromatic hydrocarbon-formaldehyde resin which is obtained by reacting alkyl benzene with formaldehyde, preferably in the presence of acid catalyst, followed by modification with a modifying agent that is reactive against a methylol group, methylene ether group, or acetal group in the resin.

The aromatic hydrocarbon-formaldehyde resin is a viscous liquid or solid resin having a structure represented by the formula:

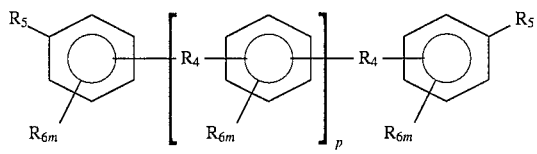

wherein p is integer of 1 to 20, $R_4$, which may be the same or different, represents a methylene group, methylene ether group, or acetal group; $R_5$, which may be the same or different, represents methylol group, methylene-methoxy group, methylenemethoxy group, ethylenemethoxy group, methyleneethoxy group, dimethylene ether methoxy group, or acetonyl group; $R_6$, which may be the same or different, represents a lower alkyl group; and m is an integer of 0 to 3. The number-average molecular weight of the aromatic hydrocarbon-formaldehyde resin used in the present invention is about 300 or more, preferably about 500 or more, more preferably about 600 or more.

The alkyl benzene used as a raw material of the aromatic hydrocarbon-formaldehyde resin is not limited. Toluene, ethylbenzene, xylene, methylethylbenzene, trimethylbenzene, etc., are specific but non-limiting examples. Preferably, xylenes, trimethylbenzenes, more preferably, m-xylene, mixed xylene in which m-xylene is the main component, and 1,3,5-trimethylbenzene can be used.

The modifying agent by which the aromatic hydrocarbon-formaldehyde resin is modified is not limited, and can be any conventional modifying agent reactive against the methylol group, methylene ether group, or acetal group. Specific examples include the following non-limiting modifying agents:

(1) Phenols:
Phenol, resorcinol, bisphenol A, cresol, or o-, m-, p-alkyl phenol, such as p-tert-butylphenol, a novolac which is a condensate of phenol and aldehyde;

(2) Aromatic carboxylic acid:
Benzoic acid, p-hydroxy benzoic acid, p-amino benzoic acid, phthalic acid, isophthalic acid, terephthalic acid, trimellitic acid, trimellitic acid anhydride, pyromellitic acid, naphthoic acid;

(3) Saturated or unsaturated, aliphatic or aliphatic-cyclic carboxylic acids:
Maleic anhydride, fumaric acid, stearic acid, adipic acid, dimer acid, resin acid, rosin, 3,6-endmethylenetetrahydrophthalic acid, tetrahydroterephthalic acid, and saturated aliphatic hydroxy carboxylic acid having 3 to 6 carbon atoms, such as lactic acid, glycerin, malic acid, tartaric acid, citric acid, gluconic acid;

(4) Alcohols:
Tert-butyl alcohol, ethylene glycol, glycerin, 1,4-tetramethyleneglycol, polyethyleneglycol, polypropyleneglycol, polytetramethyleneglycol, xyleneglycol;

(5) Amines:
Aniline, phenylenediamine, xylenediamine;

(6) Others:
Aromatic hydrocarbons, such as acenaphtene, acenaphtylene, anthracene.

Although the amount of the modifying agent varies widely depend upon the kind of the modifying agent, generally, 8 times and less by weight, preferably, 5 times and less, more preferably between 0.2 to 2.5 times, based on the aromatic hydrocarbon-formaldehyde resin. The kind and the amount of modifier into the resin is suitably selected to provide an aromatic hydrocarbon-formaldehyde resin having an average molecular weight of at least about 500 and a softening temperature of 60° to 200° C.

The amount of the modified aromatic hydrocarbon-formaldehyde resin used in the present invention is about 0.01 to 10% by weight, preferably about 0.1 to 8% by weight, based on the total composition weight. When using less than about 0.01% by weight, dispersion of the resin is unstable, the improvement of moldability and impact-resistance is insufficient, and when using more than about 10% by weight, it causes a decrease of the heat distortion temperature, and reduces several kinds of mechanical strength, and appearance such as smoothness.

The rubber-like polymer (c) used in the present invention is for improvement of impact strength of the resin composition. Specific examples include the following rubber-like polymers:

Polybutadiene, polyisoprene, polychloroprene, polychlorobutadiene, ethylene-propylene-nonconjugateddiene terpolymer, styrene-butadiene copolymer (random copolymers, block copolymers, and graft copolymer, are all included) and their hydrogenates, isobutylene-butadiene copolymer, acrylonitrile-butadiene copolymer, butylacrylate-acrylonitrile copolymer, styrene-isoprene copolymer and their hydrogenates, styrene-butadiene-styrene tereblock copolymer and its hydrogenates, styrene-isoprene-styrene tereblock copolymer and its hydrogenates, methylmethacrylate-butadiene copolymer, and butylmethacrylate-butadiene copolymer.

The amounts of rubber-like polymer used in the present composition is about 2 to 30% by weight, preferably, about 3 to 20% by weight, more preferably, about 5 to 15% by weight. When using less than about 2 wt. %, the improvement of the impact resistance is not enough, and in case of more than about 30% by weight, dispersion properties are reduced and appearance properties, such as smoothness, and mechanical properties are adversely affected.

The polyamide resin (d) used in the present invention is a conventional resin having a —CONH— bond in the main chain, and is not limited if it can be heat-melted. Specific examples include Nylon 4, Nylon 6, Nylon 66, Nylon 12, Nylon 6/10 copolymer, Nylon 6/66 copolymer, polyamide from terephthalic acid and trimethyl hexamethylenediamine, polyamide from adipinic acid and methaxylilenediamine, polyamide from adipinic acid and azelaic acid and 2,2-bis(aminocyclohexyl)propane, polyamide from terephthalic acid and 4,4'-diaminodicyclohexylmethane.

The mixing ratio of two ingredients, polyphenylene-ether resin (PPE) and polyamide resin (PA) is within the range of PPE/PA=about 20/80 to about 80/20 based on weight, preferably, in the range of about 30/70 to about 70/30, more preferably, in the range of about 35/65 to about 65/35.

The composition in which the ratio of polyphenylene resin is present in an amount lower than the above range loses excellent heat properties, mechanical properties and electric properties which polyphenylene ether resin originally has. Further, the composition in which the ratio of polyphenylene resin is present in an amount higher than the above range has high melting viscosity, and has small improvement effect of solvent-resistance, oil-resistancy, and not preferable.

In the present resin composition, Especially, polypropylene resin (e) can be added in amounts of about 2 to 60% by weight. The present resin composition formulated with the polypropylene resin of the present invention can be achieved of weight-saving of a molded article, because of decreasing of specific gravity, and has excellent moldability because of its high flowability in molten condition. The polypropylene resin used in the present invention may be propylene homopolymer, ethylenepropylene copolymer, ethylene-propylene-α-olefin copolymer, polypropylene resin modified with carboxylic acid, such as maleic anhydride, humalic acid, itaconic acid, malic acid and citric acid, those which a melt-flow rate of about 1 to about 100° at 230° C. under loading of 2.15 kg is preferable. The dose of polypropylene resin may be about 2 to 60 wt. %, preferably, about 10 to 50 wt. %. In the case of not more than 2 wt. %, the weight-saving of a molded article and the improvement of flowability in molten condition are insufficient. In the case of 60 wt. % and more, the mechanical strength decreases.

In the present resin composition, other thermoplastic resins, for example, polycarbonate, polyethylene terephthalate, polybutyleneterephthalate, polyethylene, polyacetal, poly MMA, MS resin, MBS, AS, AAS, AES, AMBS, polystyrene, HIPS, styrene-maleic acid copolymer resin (for example, DYLARK manufactured by Arco Chemical), polyphenylenesulfide, polyetheretherketone, polysulfon, can be added.

In the present resin composition, any of several known additives can be formulated if desired, including any conventional strengthening agent, filler, stabilizing agent, ultraviolet absorber, chemical destaticizer, lubricant, mold lubricant, dye, paint, or flame-retardant. Examples of the filler and strengthening agent include glass powder, glass fiber, glass beads, glass flakes, glass fiber cloth, glass fiber mat, graphite, carbon fiber, carbon fiber cloth, carbon fiber mat, carbon black, carbon flakes, metal fibers, metal flakes or metal powder made of aluminum, brass, stainless steel, copper, organic fiber, synthetic mica or fluorinated mica, zinc oxide, zinc oxide whiskers, titanium oxide, titanic acid whiskers, silicon carbide fibers, mica, talc, clay, needle potassium titanate, wollastonite, calcium carbonate, high-modulus polyamide fibers, and high-modulus polyester fibers. Further, in order to improve the appearance or smoothness of the molded material by increasing the rigidity or strength, inorganic fiber having small fiber diameter is preferably used, such as E-FMW-800 manufactured by Nihon Muki Co., Ltd. (average fiber diameter of 0.8 μm) or E-FMW-1700 (average fiber diameter of 0.6 μm).

In the present resin composition, the surface of the above-described strengthening agent can be subjected to surface treatment by any known surface treatment agent, for example, vinylalkylsilane, methacryloalkylsilane, epoxyalkylsilane, aminoalkylsilane, mercaptoalkylsilane, chloroalkylsilane, titanate coupling agent such as isopropyltriisostearoyltitanate and zircoaluminate coupling agents. Further, as greige goods for fibers, known epoxy, urethane, polyester, and styrene-type binders can be used.

In the present resin composition, if desired, triphenylphosphate or tricresylphosphate, or a polycondensate thereof, or a known phosphorous compound such as red phosphorous can be added as a flame retardant. Further, decabromdiphenylether, halogenated compounds, such as brominated polystyrene, low molecular weight brominated polycarbonate, or brominated epoxy compound can be added as a flame retardant. An auxiliary agent, such as antimony trioxide, antimony tetraoxide, zirconium oxide can be used in combination.

In the present resin composition, if desired, a known heat stabilizer or oxidation inhibitor, such as phenol, phosphite, thioether, hindered phenol, zinc sulfide, or zinc oxide can be used.

The present resin composition can be obtained by heating and melt-mixing the components. The temperature and time of the melt-mixing is not limited. For the mixing, although an extruder, a Banbury mixer, or a kneader may be used, an extruder is preferably used from the viewpoint of simplified operation.

In the formulation operation, the order of formulation of the ingredients is not limited. For example, the following methods can be used: the method which all ingredients are mixed at once, the method which at first, polyamide resin and modified aromatic hydrocarbon-formaldehyde resin are melt-mixed, then the polyphenylene ether resin and the rubber-like polymer are additionally added, preferably the method which at first polyphenylene-ether resin and modified aromatic hydrocarbon-formaldehyde resin is melt-mixed, then rubber-like polymer and polyamide resin is additionally added, more preferably, the method which at first polyphenylene-ether resin, modified aromatic hydrocarbon-formaldehyde resin and rubber-like polymer is melt-mixed, then polyamide resin is additionally added. In preparing of the present resin composition formulated with the polypropylene resin, at first polyphenylene-ether resin, modified aromatic hydrocarbon-formaldehyde resin, rubber-like polymer and polypropylene resin is melt-mixed, then polyamide resin is additionally added.

The present invention is now illustrated in greater detail with reference to the following specific examples and embodiments, which are not to be construed as limiting the scope of the invention. Unless otherwise indicated, all parts, percents and ratios are by weight.

EXAMPLES

The test method in the Examples and Comparative Examples were as follows:
(1) Tensile strength
  Conducted for 5 pieces under the conditions of ASTM-D638, stress rate of 5 mm/min., test temperature of 23° C., and calculated average tensile strength (MPa) of and breaking extension (%) of 5 pieces.
(2) Izod impact strength (hereinafter referred to as IZOD, unit is J/m)
  According to ASTM-D256, a notch having 0.25 R is notched by cutting a test piece having a width of 3.2 mm, and measured for 5 pieces at 23° C. The result shown is an average value of 5 pieces.
(3) Deflection temperature under load (hereinafter abbreviated to as DTUL, unit is °C.)
  According to ASTM-D648, 3 pieces were measured at 0.45 MPa; the result is the average value.
(4) Bend strength (hereinafter referred to as Bend Strength, Unit is MPa and as Bending modulus, unit is GPa).
  According to ASTM-D790, 5 pieces were measured at 23° C.; the result is the average value.

Synthesis method for the saturated hydroxycarboxylic acid modified aromatic hydrocarbon-formaldehyde resin was as follows:

REFERENCE EXAMPLE 1

Into a 2 L flask, 924 g of xylene-formaldehyde rein (Trademark "NIKANOL G", average molecular weight of 616, manufactured by Mitsubishi Gas Chemical Company, Inc., Japan) and 525 g of tartaric acid was added and heated to 125° C. Generated formaldehyde was distilled out with charging steam, and reacted for 3.5 hours. The reaction temperature was increased to 155° C., reacted for a further 1 hour, then cooled and solidified. Softening point of 90° C., 1350 g of product was obtained.

REFERENCE EXAMPLE 2

Into a 2 L flask, 924 g of xylene-formaldehyde resin (Trademark "NIKANOL G", average molecular weight of 616, manufactured by Mitsubishi Gas Chemical Company, Inc., Japan) and 402 g of malic acid was added and heated to 130° C. Generated formaldehyde was distilled out with charging steam, and reacted for 4.5 hours. The reaction temperature was increased to 170° C., reacted for a further 1.5 hours, then cooled and solidified. Softening point of 105° C., 1050 g of product was obtained.

REFERENCE EXAMPLE 3

Into a 2 L flask, 924 g of xylene-formaldehyde resin (Trademark "NIKANOL G", average molecular weight of 616, manufactured by Mitsubishi Gas Chemical Company, Inc., Japan) and 536 g of malic acid was added and heated to 130° C. Generated formaldehyde was distilled out with charging steam, and reacted for 4.5 hours. The reaction temperature was increased to 160° C., reacted for a further 2.0 hours, then cooled and solidified. Softening point of 100° C., 1200 g of resin was obtained. 100 g of this resin was dissolved in 800 ml of ethyl acetate, and free malic acid was extracted by 1L of water. In the final product resin after extracting ethyl acetate, 0.08% of free malic acid remained.

EXAMPLE 1

To 4.98 kg of poly(2,6-dimethyl-1,4-phenylene) ether powder having a intrinsic viscosity of 0.45 dl/g (25° C., in chloroform), 180 g of maleic anhydride-modified xylene-formaldehyde resin (Trademark "NIKANOL A", manufactured by Mitsubishi Gas Chemical Company Inc., Japan) having a softening point of 93° C. and number average molecular weight of 1850, and 840 g of styrene-butadiene-styrene-type block copolymer (SEBS) (Trademark "KREITON G1651", manufactured by Shell Chemical) were mixed, then, melt-mixed using a biaxial extruder at 290° C., extruded and pelletized.

5.0 kg of the above pellet and 5.0 kg of polyamide (Trademark "AMILAN CM1097", polyamide-6 manufactured by Toray Industries, Inc., Japan) were mixed (the mixing ratio is shown in Table 1), then melt-mixed using a biaxial extruder at 280° C. From the pellets (a specific gravity of 1.10) thus obtained were molded various test pieces by injection molding.

Various properties measured using these test pieces are shown in Table 2.

EXAMPLE 2

The same procedures were conducted as in EXAMPLE 1, except that the amount of poly(2,6-dimethyl-1,4-phenylene) ether powder was 4.8 kg, and the amount of modified xylene-formaldehyde resin was 360 g.

Various properties measured using obtained test pieces are shown in Table 2.

EXAMPLE 3

The same procedures were conducted as in EXAMPLE 1, except that the amount of poly(2,6-dimethyl-1,4-phenylene) ether powder was 4.44 kg, and the amount of modified xylene-formaldehyde resin was 720 g.

Various properties measured using obtained test pieces are shown in Table 2.

COMPARATIVE EXAMPLE 1

The same procedures were conducted as in EXAMPLE 1, except that the amount of poly(2,6-dimethyl-1,4-phenylene) ether powder was 5.16 kg, and modified xylene-formaldehyde resin was not used.

Various properties measured using obtained test pieces are shown in Table 2.

COMPARATIVE EXAMPLE 2

The same procedures were conducted as in EXAMPLE 1, except that the amount of poly(2,6-dimethyl-1,4-phenylene) ether powder was 5.11 kg, and the amount of modified xylene-formaldehyde resin was 0.48 g.

Various properties measured using obtained test pieces are shown in Table 2.

COMPARATIVE EXAMPLE 3

To 3.96 kg of poly(2,6-dimethyl-1,4-phenylene) ether powder having a intrinsic viscosity of 0.45 dl/g (25° C., in chloroform), 1.80 kg of maleic anhydride-modified xylene-formaldehyde resin (Trademark "NIKANOL A", manufactured by Mitsubishi Gas Chemical Company, Inc., Japan) having a softening point of 93° C. and number average molecular weight of 1850, and 840 g of styrene-butadiene-styrene-type block copolymer (SEBS) (Trademark "KREITON G1651", manufactured by Shell Chemical) were mixed, then melt-mixed using a biaxial extruder at 290° C., extruded and pelletized.

5.5 kg of the above pellets and 4.5 kg of Nylon 6 (Trademark "AMILAN CM1097", manufactured by Toray Industries, Inc., Japan) were mixed, then melt-mixed using a biaxial extruder at 280° C. The pellets thus obtained were molded to various test pieces by injection molding.

Various properties measured using these test pieces are shown in Table 2.

EXAMPLE 4

To 4.56 kg of poly(2,6-dimethyl-1,4-phenylene) ether powder having a intrinsic viscosity of 0.45 dl/g (25° C., in chloroform), 360 g of maleic anhydride-modified xylene-formaldehyde resin (Trademark "NIKANOL A", manufactured by Mitsubishi Gas Chemical Company, Inc., Japan) having a softening point of 93° C. and number average molecular weight of 1850, and 1.68 kg of styrene-butadiene-styrene-type block copolymer (SEBS) (Trademark "KREITON G1651", manufactured by Shell Chemical) were mixed, then melt-mixed using a biaxial extruder at 290° C., extruded and pelletized.

5.5 kg of the above pellet and 4.5 kg of Nylon 6 (Trademark "AMILAN CM1097", manufactured by Toray Industries, Inc., Japan) were mixed, then melt-mixed using a biaxial extruder at 280° C. The pellets thus obtained were molded to various test pieces by injection molding.

Various properties measured using these test pieces are shown in Table 2.

COMPARATIVE EXAMPLE 4

The same procedures were conducted as in EXAMPLE 1, except that the amount of poly(2,6-dimethyl-1,4-phenylene) ether powder was 5.52 kg, and the amount of modified xylene-formaldehyde resin was 360 g and the amount of styrene-butadiene-styrene-type block copolymer was 120 g.

Various properties measured using obtained these test pieces are shown in Table 2.

EXAMPLE 5

The same procedures were conducted as in EXAMPLE 2, except that tert-butylphenol-modified xylene-formaldehyde resin (Trademark "NIKANOL GHP", manufactured by Mitsubishi Gas Chemical Company, Inc., Japan) having a softening point of 167° C. and number average molecular weight of 1500 were used.

Various properties measured using the obtained test pieces are shown in Table 2.

COMPARATIVE EXAMPLE 5

To 5.1 kg of poly(2,6-dimethyl-1,4-phenylene) ether powder having an intrinsic viscosity of 0.45 dl/g (25° C., in chloroform), 60 g of maleic anhydride and 840 g of styrene-butadiene-styrene-type block copolymer (SEBS) (Trademark "KREITON G1651", manufactured by Shell Chemical) were mixed, then melt-mixed using a biaxial extruder at 290° C., extruded and pelletized. Workability was very bad because of a strong odor.

5.0 kg of the above pellet and 5.0 kg of Nylon 6 (Trademark "AMILAN CM1097", manufactured by Toray Industries, Inc., Japan) were mixed, then melt-mixed using a biaxial extruder at 280° C. The pellets thus obtained were molded to various test pieces by injection molding.

Various properties measured using these test pieces are shown in Table 2.

EXAMPLE 6

To 4.0 kg of poly(2,6-dimethyl-1,4-phenylene) ether powder having an intrinsic viscosity of 0.45 dl/g (25° C., in chloroform) and 800 g of hydrogenated styrene-isoprene-styrene-type block copolymer (Trademark "SEPTON 4055", manufactured by KURARAY CO., LTD., Japan, abbreviated as SEPS), 64 g of tartaric acid-modified xylene-formaldehyde resin of Reference Example 1 were mixed, then melt-mixed using a biaxial extruder at 290° C., extruded and pelletized.

3.0 kg of the above pellet and 2.5 kg of Nylon 6 (Trademark "AMIRAN CM1097", manufactured by Toray Industries, Inc., Japan) were mixed, then melt-mixed using a biaxial extruder at 290° C. The pellets thus obtained were vacuum-dried at 105° C. for 20 hours, and molded to various test pieces by injection molding.

Various properties measured using these test pieces are shown in Table 3.

EXAMPLE 7

The same procedures were conducted as in EXAMPLE 1, except that the tartaric acid-modified xylene-formaldehyde resin of Reference Example 1 was used in an amount of 120 g and pelletized as in EXAMPLE 6, and except that 3.0 kg of the pellets and 2.45 kg of the polyamide of EXAMPLE 6 were mixed and pelletized.

Various properties measured using the obtained test pieces are shown in Table 3.

EXAMPLE 8

The same procedures were conducted as in EXAMPLE 6, except that 640 g of hydrogenated styrene-isoprene-styrene-type block copolymer was used, and the tartaric acid-modified xylene-formaldehyde resin of Reference Example 1 replaced by 40 g of the malic acid-modified xylene-formaldehyde resin of Reference Example 2. Further, 3.0 kg of the pellets obtained and 2.55 kg of the polyamide of EXAMPLE 6 were mixed and pelletized.

Various properties measured using the obtained test pieces are shown in Table 3.

EXAMPLE 9

The same procedures were conducted as in EXAMPLE 8, except that the malic acid-modified xylene-formaldehyde resin of Reference Example 2 was used in an amount of 160 g and pelletized, and 3.0 kg of the pellets obtained and 2.5 kg of the polyamide of EXAMPLE 6 were mixed and pelletized.

Various properties measured using the obtained test pieces are shown in Table 3.

EXAMPLE 10

The same procedures were conducted as in EXAMPLE 9, except that the hydrogenated styrene-isoprene-styrene-type block copolymer was substituted with 800 g of hydrogenated styrene-butadiene-styrene-type block copolymer (Trademark "KREITON G1651", manufactured by Shell Chemical, abbreviated to as SEBS), and pelletized, and 3.0 kg of the pellets and 2.4 kg of the polyamide of EXAMPLE 6 were mixed and pelletized.

Various properties measured using the obtained test pieces are shown in Table 3.

EXAMPLE 11

The same procedures were conducted as in EXAMPLE 9, except that the malic acid-modified xylene-formaldehyde resin of Reference Example 2 was substituted for the malic acid-modified xylene-formaldehyde resin of Reference Example 3.

Various properties measured using the obtained test pieces are shown in Table 3.

EXAMPLE 12

The same procedures were conducted as in EXAMPLE 11, except that 480 g of the malic acid-modified xylene-formaldehyde resin of Reference Example 3 was used and pelletized, and 3.0 kg of the pellets obtained and 2.3 kg of the polyamide of EXAMPLE 6 were mixed and pelletized.

Various properties measured using the obtained test pieces are shown in Table 3.

COMPARATIVE EXAMPLE 6

The same procedures were conducted as in EXAMPLE 6, except that the malic acid-modified xylene-formaldehyde resin of Reference Example 1 was not used.

Various properties measured using the obtained test pieces are shown in Table 4.

COMPARATIVE EXAMPLE 7

The same procedures were conducted as in EXAMPLE 6, except that the amount of the malic acid-modified xylene-formaldehyde resin of Reference Example 1 was used in an amount of 0.4 g and pelletized, and 3.0 kg of the pellets obtained and 2.5 kg of the polyamide of EXAMPLE 6 were mixed and pelletized.

Various properties measured using the obtained test pieces are shown in Table 4.

COMPARATIVE EXAMPLE 8

The same procedures were conducted as in EXAMPLE 8, except that the amount of the malic acid-modified xylene-formaldehyde resin of Reference Example 2 was used in an amount of 0.4 g and pelletized, and 3.0 kg of the pellets obtained and 2.55 kg of the polyamide of EXAMPLE 6 were mixed and pelletized.

Various properties measured using the obtained test pieces are shown in Table 4.

COMPARATIVE EXAMPLE 9

The same procedures were conducted as in EXAMPLE 7, except that the SEPS was not used, and 3.0 kg of the pellets obtained and 2.9 kg of the polyamide of EXAMPLE 6 were mixed and pelletized.

Various properties measured using the obtained test pieces are shown in Table 4.

EXAMPLE 13

7.7 kg of poly(2,6-dimethyl-1,4-phenylene) ether (manufactured by Mitsubishi Gas Chemical Company, Inc., Japan) powder having an intrinsic viscosity of 0.45 dl/g (25° C., in chloroform), 160 g of malic anhydride-modified xylene-formaldehyde resin of Reference Example 2, and 1.5 kg of styrene-butadiene-styrene-type block copolymer (SEBS) (Trademark "KREITON G1651", manufactured by Shell Chemical) and 2.3 kg of polypropylene resin ("K4017", manufactured by Chisso Corporation, Japan) were mixed, then, melt-mixed using a biaxial extruder at 290° C., extruded and pelletized.

5.0 kg of the above pellet and 5.0 kg of polyamide-6 (Trademark "AMILAN CM1097", manufactured by Toray Industries, Inc., Japan) were mixed (the mixing ratio is shown in Table 3), then melt-mixed using a biaxial extruder at 280° C. From the pellets (a specific gravity of 1.05) thus obtained were molded various test pieces by injection molding.

Various properties measured using these test pieces are shown in Table 3.

TABLE 1

| EXAMPLE/ COMPARATIVE EXAMPLE | PPE | Modified aromatic hydrocarbon-formaldehyde resin | SEBS | Polyamide | Maleic anhydride |
|---|---|---|---|---|---|
| EXAMPLE 1 | 41.5 | 1.5 | 7.0 | 50.0 | — |
| EXAMPLE 2 | 40.0 | 3.0 | 7.0 | 50.0 | — |
| EXAMPLE 3 | 37.0 | 6.0 | 7.0 | 50.0 | — |
| COMPARATIVE EXAMPLE 1 | 43.0 | — | 7.0 | 50.0 | — |
| COMPARATIVE EXAMPLE 2 | 42.9 | 0.004 | 7.0 | 50.0 | — |
| COMPARATIVE EXAMPLE 3 | 33.0 | 15.0 | 7.0 | 45.0 | — |
| EXAMPLE 4 | 38.0 | 3.0 | 14.0 | 45.0 | — |
| COMPARATIVE EXAMPLE 4 | 46.0 | 3.0 | 1.0 | 50.0 | — |
| EXAMPLE 5 | 40.0 | 3.0 | 7.0 | 50.0 | — |
| COMPARATIVE EXAMPLE 5 | 42.5 | — | 7.0 | 50.0 | 0.5 |

The figures in the table show part by weight.

TABLE 2

| EXAMPLE COMPARATIVE EXAMPLE | Tensile strength at yield | Tensile break elongation | Bend strength | Bending modulus | DTUL | IZOD impact strength |
|---|---|---|---|---|---|---|
| EXAMPLE 1 | 55 | 37 | 83 | 2.1 | 184 | 207 |
| EXAMPLE 2 | 56 | 36 | 85 | 2.2 | 181 | 556 |
| EXAMPLE 3 | 56 | 34 | 84 | 2.2 | 176 | 537 |
| COMPARATIVE EXAMPLE 1 | 30 | 2 | 55 | 2.0 | 190 | 14 |
| COMPARATIVE EXAMPLE 2 | 46 | 6 | 72 | 2.1 | 186 | 49 |
| COMPARATIVE EXAMPLE 3 | 40 | 29 | 68 | 1.8 | 149 | 387 |
| EXAMPLE 4 | 43 | 25 | 71 | 1.7 | 174 | 545 |
| COMPARATIVE EXAMPLE 4 | 57 | 29 | 85 | 2.4 | 187 | 116 |
| EXAMPLE 5 | 52 | 13 | 79 | 2.0 | 180 | 97 |
| COMPARATIVE EXAMPLE 5 | 55 | 30 | 83 | 2.1 | 182 | 270 |

TABLE 3

| Compounding ratio | EXAMPLE NO. | | | | | | | |
|---|---|---|---|---|---|---|---|---|
| | 6 | 7 | 8 | 9 | 10 | 11 | 12 | 13 |
| PPE | 44.8 | 44.3 | 46.2 | 45.5 | 44.8 | 45.5 | 44.2 | 33.0 |
| Polyamide | 45.5 | 45.5 | 45.9 | 45.5 | 44.4 | 45.5 | 43.4 | 50.0 |
| SEPS | 9.0 | 9.0 | 7.4 | 7.3 | — | 7.3 | 7.1 | — |
| SEBS | — | — | — | — | 9.0 | — | — | 6.4 |
| Aromatic hydrocarbon-formaldehyde resin | 0.7 | 1.3 | 0.5 | 1.8 | 1.8 | 1.8 | 5.3 | 0.7 |
| Polypropylene resin | — | — | — | — | — | — | — | 9.9 |

| Properties | NO. OF COMPARATIVE EXAMPLE | | | | | | | |
|---|---|---|---|---|---|---|---|---|
| | (1) | (1) | (2) | (2) | (2) | (3) | (3) | (2) |
| Tensile strength (MPa) | 50 | 52 | 56 | 57 | 51 | 57 | 57 | 47 |
| Break elongation (%) | 85 | 98 | 90 | 105 | 95 | 103 | 102 | 100 |
| IZOD (J/m) | 420 | 550 | 490 | 550 | 610 | 565 | 545 | 200 |
| DTUL (°C.) | 185 | 186 | 187 | 188 | 186 | 188 | 188 | 175 |

TABLE 4

| Compounding ratio | COMPARATIVE EXAMPLE NO. | | | |
|---|---|---|---|---|
| | 6 | 7 | 8 | 9 |
| PPE | 45.5 | 45.5 | 46.6 | 49.4 |
| Polyamide | 45.5 | 45.5 | 45.9 | 49.2 |
| SEPS | 9.0 | 9.0 | 7.4 | 0 |
| Aromatic hydrocarbon-formaldehyde resin | 0 | 0.005 | 0.005 | 1.5 |

| Properties | NO. OF COMPARATIVE EXAMPLE | | | |
|---|---|---|---|---|
| | | (1) | (2) | (1) |
| Tensile strength (MPa) | 29 | 31 | 35 | 30 |
| Break elongation (%) | 3 | 5 | 7 | 4 |
| IZOD (J/m) | 13 | 48 | 58 | 20 |
| DTUL (°C.) | 187 | 187 | 187 | 187 |

The present thermoplastic resin composition provides a molded article having excellent appearance, mechanical properties, dimensional accuracy, molding processing characteristics, solvent-resistance, oil-resistance, and further, has improved heat stability in molding and resistance to heat deterioration and discoloration when used under conditions of high temperature atmosphere. It has excellent impact resistance, and can be used in various fields, such as electronic and electric components, automotive components, mechanical components, architectural components, and household commodities.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition comprising:

(a) about 20 to 80% by weight based on total composition weight of polyphenylene ether resin comprising at least one structural unit in its backbone represented by the formula:

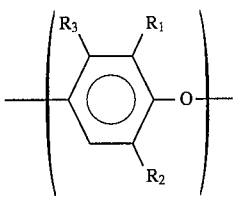

wherein $R_1$ represents a lower alkyl group having 1 to 3 carbon atoms; $R_2$ represents a hydrogen atom or a lower alkyl group having 1 to 3 carbon atoms; and $R_3$ represents a hydrogen atom or a lower alkyl group having 1 to 3 carbon atoms;

(b) about 0.01 to 10% by weight based on total composition weight of a saturated or unsaturated aliphatic or aliphatic cyclic carboxylic acid modified aromatic hydrocarbon-formaldehyde resin;

(c) about 2 to 30% by weight based on total composition weight of a styrene-diene block copolymer; and (d) about 20 to 80% by weight based on total composition weight of a polyamide resin.

2. The thermoplastic resin composition according to claim 1, wherein the saturated or unsaturated aliphatic or aliphatic cyclic carboxylic acid which modifies the aromatic hydrocarbon-formaldehyde resin is a saturated hydroxy carboxylic acid.

3. A method for preparing the thermoplastic resin composition according to claim 1, the method comprising:

i) melt-mixing said (a) polyphenylene ether resin, said (b) modified aromatic hydrocarbon-formaldehyde resin and said (c) rubber polymer; and then ii) adding and melt-mixing a polyamide resin.

4. The thermoplastic resin composition according to claim 1, wherein the aromatic hydrocarbon-formaldehyde resin is a viscous liquid or solid resin having a structure represented by the formula:

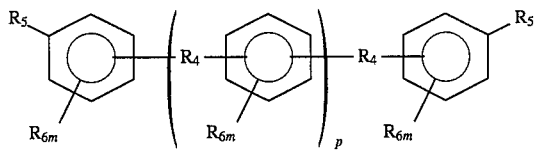

wherein p is an integer of 1 to 20; $R_4$, which may be the same or different, represents a methylene group, a methylene ether group, or an acetal group; $R_5$, which may be the same or different, represents a methylol group, a methylene-methoxy group, an ethylenemethoxy group, a methyleneethoxy group, a dimethylene ether methoxy group, or an acetonyl group; $R_6$, which may be the same of different, represents a lower alkyl group having 1 to 3 carbon atoms; and m is an integer of 0 to 3.

5. A thermoplastic resin composition comprising:

(a) about 20 to 80% by weight based on total composition weight of polyphenylene ether resin comprising at least one structural unit in its backbone represented by the formula:

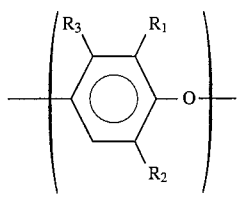

wherein $R_1$ represents a lower alkyl group having 1 to 3 carbon atoms; $R_2$ represents a hydrogen atom or a lower alkyl group having 1 to 3 carbon atoms; and $R_3$ represents a hydrogen atom or a lower alkyl group having 1 to 3 carbon atoms;

(b) about 0.01 to 10% by weight based on total composition weight of a saturated or unsaturated aliphatic or aliphatic cyclic carboxylic acid modified aromatic hydrocarbon-formaldehyde resin;

(c) about 2 to 30% by weight based on total composition weight of a styrene-diene block copolymer;

(d) about 20 to 80% by weight based on total composition weight of a polyamide resin; and (e) about 2 to 60% by weight based on total composition weight of a polypropylene resin.

* * * * *